(12) United States Patent
Bagnall

(10) Patent No.: US 8,529,204 B2
(45) Date of Patent: Sep. 10, 2013

(54) GAS TURBINE ENGINE HAVING A NOSE CONE ASSEMBLY RIGIDLY ATTACHED IN AN AXIAL DIRECTION BUT FLEXIBLE IN A RADIAL DIRECTION

(75) Inventor: Adam MacGregor Bagnall, Derbyshire (GB)

(73) Assignee: Rolls-Royce PLC (GB)

( * ) Notice: Subject to any disclaimer, the term of this patent is extended or adjusted under 35 U.S.C. 154(b) by 895 days.

(21) Appl. No.: 12/369,809

(22) Filed: Feb. 12, 2009

(65) Prior Publication Data

US 2009/0214354 A1 Aug. 27, 2009

(30) Foreign Application Priority Data

Feb. 26, 2008 (GB) .................................. 0803366.4

(51) Int. Cl.
*F01D 25/00* (2006.01)
(52) U.S. Cl.
USPC ................. 415/218.1; 416/245 R; 416/94
(58) Field of Classification Search
USPC ............... 415/218.1; 416/245 R, 94
See application file for complete search history.

(56) References Cited

U.S. PATENT DOCUMENTS

| 2,617,255 | A | 11/1952 | Niehus |
| 5,000,005 | A | 3/1991 | Kwan et al. |
| 5,341,769 | A | 8/1994 | Ueno et al. |
| 5,573,378 | A * | 11/1996 | Barcza ..................... 416/245 R |
| 5,799,491 | A | 9/1998 | Bell et al. |
| 6,199,371 | B1 | 3/2001 | Brewer et al. |
| 6,416,280 | B1 | 7/2002 | Forrester et al. |
| 6,447,255 | B1 * | 9/2002 | Bagnall et al. ............ 416/245 R |
| 6,470,685 | B2 | 10/2002 | Pidcock et al. |
| 6,561,763 | B2 * | 5/2003 | Breakwell ....................... 416/94 |
| 6,634,863 | B1 | 10/2003 | Forrester et al. |
| 6,901,757 | B2 | 6/2005 | Gerendas |
| 2002/0102160 | A1 | 8/2002 | Breakwell |

FOREIGN PATENT DOCUMENTS

| DE | 10 2005 013 421 A1 | 9/2006 |
| GB | 537451 A | 6/1941 |
| GB | 544425 A | 4/1942 |
| GB | 2363170 A | 12/2001 |
| GB | 2436132 A | 9/2007 |

* cited by examiner

*Primary Examiner* — Benny Lee
(74) *Attorney, Agent, or Firm* — McCormick, Paulding & Huber LLP

(57) ABSTRACT

A nose cone assembly for a gas turbine engine comprises a spinner and a plurality of circumferentially spaced mounting members for mounting the spinner on a fan hub of the gas turbine engine. Each of the mounting members is rigid in a generally axial direction and flexible in a generally radial direction.

19 Claims, 5 Drawing Sheets

GAS TURBINE ENGINE HAVING A NOSE CONE ASSEMBLY RIGIDLY ATTACHED IN AN AXIAL DIRECTION BUT FLEXIBLE IN A RADIAL DIRECTION

CROSS REFERENCE TO RELATED APPLICATION

This application is entitled to the benefit of British Patent Application No. GB 0803366.4, filed on Feb. 26, 2008.

FIELD OF THE INVENTION

Embodiments of the present invention relate to a nose cone assembly, and in particular to a nose cone assembly for a gas turbine engine.

A removable nose cone, sometimes called a spinner is attached to, and rotates with a fan hub in the centre of the inlet of a gas turbine engine. This nose cone provides an aerodynamic surface covering the hub hardware and directs the inlet airflow smoothly into the hub region of the gas turbine engine fan.

BACKGROUND OF THE INVENTION

Conventionally the nose cone is attached to the fan hub by a number of circumferentially spaced, axially extending bolts disposed around the base portion of the cone and engaging the fan hub assembly. To provide access to these bolts, for fitting or removing the nose cone, elliptical holes are provided in the nose cone. Alternatively pockets or indentations below the nominal surface of the cone are formed in the nose cone base region. The bolts are fitted within these pockets which are large enough to accommodate the heads of the bolts.

A problem with these arrangements is that the airflow into the fan, over the nose cone, is disturbed, in particular in the region surrounding the fan hub at the root portion of the fan blades. In the first arrangement some air flows into the elliptical holes and also the sharp edges of the holes affect and disturb the remainder of the flow of air passing over them. In the second arrangement there are more rounded edges to the pockets than are found with the holes reducing the effect they have on the airflow passing over them. However, the pockets are larger than the holes and so they will affect and disturb the flow over a larger area of the nose cone. The airflow will also flow into these pockets producing eddy flows which will again affect the airflow over the nose cone. Engine testing and analysis has shown that disturbances to the airflow over the nose cone reduce the efficiency of the root portions of the fan downstream of the nose cone. This in turn has a significant effect on the overall engine performance.

Additionally the fabrication of a nose cone incorporating pockets is complex and therefore expensive. The pockets within the nose cone, and to a certain extent the holes, increase the stresses within the nose cone requiring that the nose cone has to be made from thicker material. This undesirably increases the weight of the nose cone.

Nose cone assemblies in which a fairing surrounds part of the nose cone have been proposed. Whilst the use of a separate fairing may reduce some of the aerodynamic difficulties associated with the arrangements described above, it increases the complexity and therefore cost of the resultant nose cone assembly.

SUMMARY OF THE INVENTION

It would therefore be desirable to provide an improved nose cone assembly which reduces the disadvantages associated with existing nose cone assemblies.

According to a first aspect of the present invention, there is provided a nose cone assembly for a gas turbine engine, the nose cone assembly comprising a spinner and a plurality of circumferentially spaced mounting members for mounting the spinner on a fan hub of the gas turbine engine, each of the mounting members being rigid in a generally axial direction and flexible in a generally radial direction.

The mounting members may be circumferentially equispaced around the fan hub.

Each mounting member may include or define a first end which may be constrained against movement in the radial direction and may include or define a second end which may be movable in the radial direction. This provides each mounting member with the aforementioned radial flexibility.

Each mounting member may be substantially constrained against movement in a generally circumferential direction. In particular, the first end of each mounting member may be constrained against movement in the generally circumferential direction.

Each mounting member may include axial and radial location surfaces to provide both axial and radial location of the spinner thereon. The axial and radial location surfaces may be provided at the second end of each mounting member.

The axial and radial location surfaces may be defined by substantially orthogonal adjacent surfaces which may be provided at the second end of each mounting member. Each mounting member may include axial and radial flange members which may define respectively the axial and radial location surfaces. The axial and radial flange members may define a substantially L-shaped flange at the second end of each mounting member.

The spinner may include axial and radial location surfaces which may be co-operable with the corresponding axial and radial location surfaces of the mounting members. The spinner axial and radial location surfaces may be continuous circumferentially extending surfaces and may comprise substantially adjacent orthogonal adjacent surfaces.

The nose cone assembly may include fastening means to attach the spinner to the mounting members and the fastening means may be arranged to provide a simultaneous clamping force between the axial and radial location surfaces of the spinner and the corresponding axial and radial location surfaces of the mounting members.

The fastening means may comprise threaded fasteners and a threaded fastener may cooperate with each mounting member to thereby secure the spinner to the plurality of mounting members. The threaded fasteners may each be disposed at an angle to both the axial and radial location surfaces of the mounting members and the corresponding axial and radial location surfaces of the spinner. The threaded fasteners may each extend in a direction substantially perpendicular to an outer surface of the spinner.

The plurality of mounting members may form part of the fan hub of the gas turbine engine. Alternatively, the plurality of mounting members may form part of a generally annular mounting ring which may be secured in use, for example by a plurality of fastening means, to the fan hub of the gas turbine engine.

The fan hub or the mounting ring may act to prevent the radial movement of the first end of each of the mounting members.

The nose cone assembly may include a radial locating means. The radial locating means may abut an inner surface of the spinner. The radial locating means may thus provide further radial location of the spinner relative to the mounting members.

The radial locating means may extend circumferentially around the mounting ring. Alternatively, the assembly may include a plurality of said radial locating means and one of said radial locating means may be provided on each of the mounting members.

According to a second aspect of the present invention, there is provided a gas turbine engine including a nose cone assembly according to the first aspect of the invention.

DETAILED DESCRIPTION OF THE PREFERRED EMBODIMENTS

Figure 1:
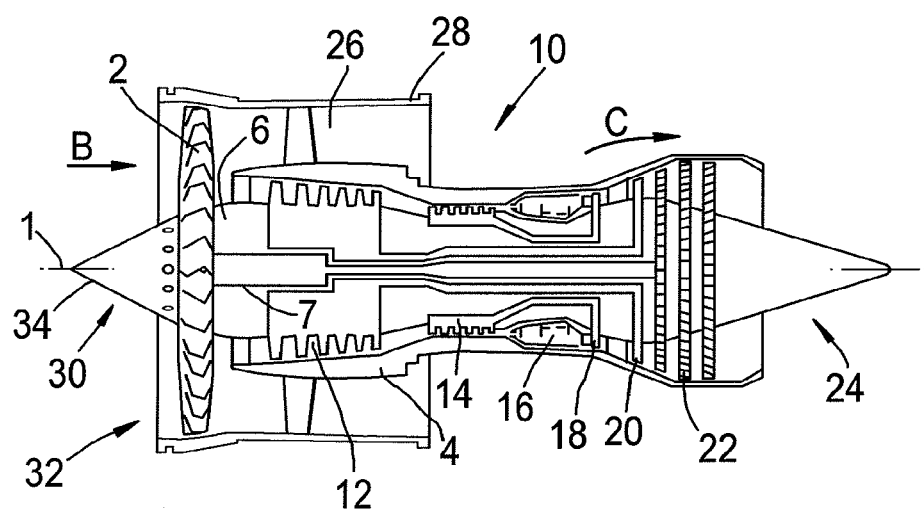
FIG. 1 is a sectional view of a gas turbine engine including a nose cone assembly according to the present invention.

Referring to FIG. 1, there is shown generally a turbofan gas turbine engine 10 comprising in flow series an inlet 32, a fan 2 and a core engine 4 comprising an intermediate pressure compressor 12, high pressure compressor 14, a combustor 16, high pressure turbine 18, intermediate pressure turbine 20, low pressure turbine 22 and an exhaust 24. The fan 2, compressors 12, 14, and turbines 18, 20, 22 all arranged to rotate about a central common engine axis 1. Air is drawn into the engine 10, as shown by arrow B, through the annular inlet 32 and into the fan 2. The fan 2 compresses the air and a portion flows, in a downstream direction, into the core engine 4 where it is further compressed, mixed with fuel and burnt in the combustor 16. Throughout this specification the terms 'downstream' and 'upstream' are used with respect to the general direction of gas flow through the engine 10 and the terms axial, radial and circumferential are used with respect to the central common engine axis 1.

The high pressure high energy gas stream exiting the combustor 16 flows through the turbines 18, 20, 22, which extract energy from, and are rotated by, the gas stream so driving the compressors 12, 14 and fan 2 via shafts drivingly interconnecting them. The gas stream then exits the turbines through the exhaust and provides a proportion of the propulsive thrust of engine 10. A second portion of the air compressed by the fan 2 flows around the core engine 4 within a fan duct 26 defined by the outside of the core engine 4 and the engine casing 28. This flow of compressed air then exits the engine 10 as shown by arrow C providing a further proportion of the engine thrust. As such the gas turbine engine 10 is of a conventional design and operation.

The fan 2 comprises a number of fan blades which are mounted upon a central fan hub 6 or disc which defines an inner aerodynamic surface of the fan. The fan hub 6 is attached to a fan shaft 7 which in turn drivingly connects the fan 2 to the low pressure turbine 22.

To provide a smooth flow of air through the inlet 32, and into the fan 2, a nose cone assembly 30 according to the invention is attached to the fan hub 6. The nose cone assembly 30 has a generally conical shape with the axis of the cone aligned with the engine axis 1 and extending in a downstream axial direction from a point vertex at an upstream end to a generally circular base adjacent the fan hub 6. The diameter of the circular base of the nose cone assembly 30 is substantially the same as that of the outer surface of the fan hub 6. The outer profile at the base of the nose cone assembly 30 is axially aligned with the outer profile of the fan hub 6 defining the inner aerodynamic surface of the fan 2 at the innermost extent of the fan blade aerofoil.

The nose cone assembly 30 comprises a generally conical one-piece spinner 34 or nose cone. The one-piece spinner 34 fully surrounds and covers the upstream region of the fan hub 6 to provide a smooth and continuous outer surface profile without the use of additional fairings as in some prior art nose cone assemblies.

In accordance with the invention, the nose cone assembly 30 comprises a plurality of mounting members which secure the spinner 34 to the fan hub 6. The mounting members are equispaced circumferentially around the engine axis 1 and are rigid in a generally axial direction and flexible in a generally radial direction. The mounting members are typically formed from spring sheet metal.

Figure 2:
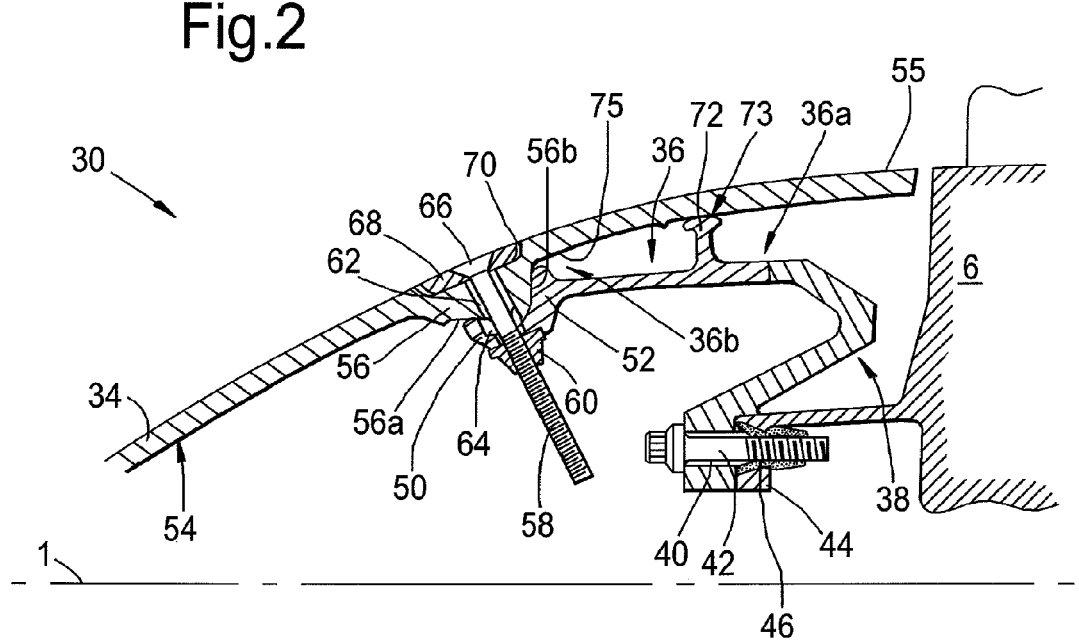
FIG. 2 is a sectional view of a nose cone assembly according to a first embodiment of the present invention.
Figure 3:
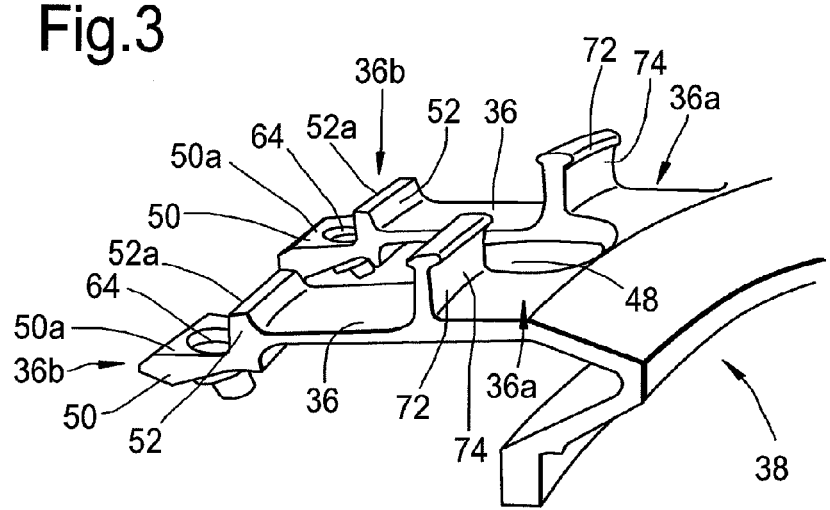
FIG. 3 is a perspective view of part of the nose cone assembly of FIG. 2.

In more detail and referring to the first embodiment illustrated in FIGS. 2 and 3, the nose cone assembly 30 (FIG. 2) comprises a continuous circumferential mounting ring 38 which includes a plurality of circumferentially spaced axially extending apertures 40 (FIG. 2). The mounting ring 38 is attached to a fan hub flange 44 using axially extending bolts 42 which pass through the apertures 40 in the mounting ring 38 and through corresponding circumferentially spaced and axially extending apertures 46 in the fan hub flange 44 (as shown in FIG. 2).

The mounting members 36 are integral with the mounting ring 38 and, in the embodiment of FIGS. 2 and 3, may be formed by machining axial slots 48 (FIG. 3) into a circumferential turned surface of the mounting ring 38 after it has been turned to provide the required geometry.

Each mounting member 36 is generally elongate and substantially parallel to the engine axis 1 (FIG. 2). Each mounting member 36 includes first and second ends 36a, 36b (FIG. 3). Movement of the first end 36a of each mounting member 36 is constrained in the axial, radial and circumferential directions by the mounting ring 38. The geometry and dimensions of the mounting members 36 are such that they are rigid in the generally axial and circumferential directions but flexible in the radial direction.

Each mounting member 36 includes axial and radial flange members 50, 52 at the second end 36b, defining a substantially L-shaped flange, and these define respective axial and radial location surfaces 50a, 52a (as shown in FIG. 3). The inner surface 54 of the spinner 34 also includes a circumferentially extending locating projection 56 defining axial and radial location surfaces 56a, 56b, typically defining a L-shaped surface, that are co-operable with the axial and radial location surfaces 50a, 52a of each mounting member 36 (as shown in FIG. 3). Thus, correct axial and radial location of the spinner 34 with respect to the fan hub 6 is easily achieved by virtue of cooperation between the respective axial and radial location surfaces 50a, 56a, 52a, 56b (as shown in FIG. 2) of the mounting members 36 and the spinner 34.

As can be most clearly seen in FIG. 2, the spinner 34 is secured to each of the mounting members 36 using fastening means in the form of threaded fasteners 58 which engage captive nuts 60. Each threaded fastener 58 passes through an aperture 62 in the spinner 34 and through an aperture 64 (FIG.

2 and FIG. 3) in the mounting member 36, typically in the axial flange member 50. Each threaded fastener 58 includes a countersunk head 66 which engages a countersunk washer 68 and the spinner includes a plurality of circumferentially spaced recesses 70 in which the heads 66 and washers 68 are locatable. The provision of the recesses 70 ensures that the heads 66 of the threaded fasteners 58 are substantially flush with the outer surface 55 of the spinner 34 when the fasteners 58 are fully tightened to mount the spinner 34 on the fan hub 6. By locating the circumferentially spaced recesses 70 in the region of the circumferentially extending locating projection 56, the spinner 34 remains sufficiently strong in this region to permit the recesses 70 to be formed without the need to provide additional material to strengthen the spinner 34.

Each of the threaded fasteners 58 extends in a direction substantially perpendicular to the outer surface 55 of the spinner 34 and is disposed at an angle to the axial and radial location surfaces 50a, 52a (FIG. 3) of the mounting member 36 and the axial and radial location surfaces 56a, 56b of the spinner 34. In particular, in the embodiment of FIGS. 2 and 3, each threaded fastener 58 (FIG. 2) defines an acute angle with the axial and radial location surfaces 50a, 52a of the mounting member 36. It will thus be appreciated that when each of the threaded fasteners 58 engages its respective captive nut 60 and is fully tightened, a simultaneous clamping force is provided between the axial and radial location surfaces 50a, 52a of each mounting member 36 and the corresponding axial and radial location surfaces 56a, 56b of the spinner 34.

The radial flexibility of each mounting member 36 allows the spinner 34 to be securely clamped to the plurality of mounting members 36, and hence the fan hub 6 (FIG. 2), without causing distortion of, and resultant stresses in, the spinner 34 due to interference between the circumferential surfaces of the respective components. Such interference may be due to dimensional mismatches occurring as a result of manufacturing and/or assembly tolerances and/or differential radial growth. Distortion of the spinner 34, and in particular of the outer surface 55, would be undesirable as this would affect the aerodynamic profile of the spinner 34 and hence the airflow into the engine 10 (FIG. 1).

The nose cone assembly 30 optionally includes radial locating means 72 arranged to abut the inner surface 54 (FIG. 2) of the spinner 34 when the threaded fastener 58 is in engagement with the captive nut 60 such that the respective axial and radial locating surfaces of the mounting members 36 and the spinner 34 are clamped together. The radial locating means 72 provides an additional radial location of the spinner 34 relative to the mounting members 36 thus ensuring concentricity of the spinner 34 with respect to the fan hub 6 and the fan rotating assembly.

In the embodiment of FIGS. 2 and 3, the radial locating means 72 comprises a plurality of upstanding spigots 74 (FIG. 3), one each of which is provided on each mounting member 36. Each spigot 74 extends in a radial direction in use and is located in the region of the first end 36a of the mounting member 36 where there is less radial movement due to constraint by the mounting ring 38. This ensures that the spigots 74 possess significant radial stiffness.

Prior to clamping of the spinner 34 onto the mounting members 36, there may be a small radial clearance 73 (FIG. 2) between the end of the spigots 74 and the inner surface 54 of the spinner 34 to facilitate mounting of the spinner 34 on, as well as removal of the spinner 34 from, the mounting members 36. Sufficient radial clearance 75 (FIG. 2) may also be provided between the circumferentially outer end of each radial flange member 52 and the inner surface 54 of the spinner 34 so that when the spinner 34 is clamped onto the mounting members 36, these radial clearances 73, 75 are taken up, causing the end of the spigots 74 to abut the inner surface 54 of the spinner 34 as aforesaid.

Figure 4:
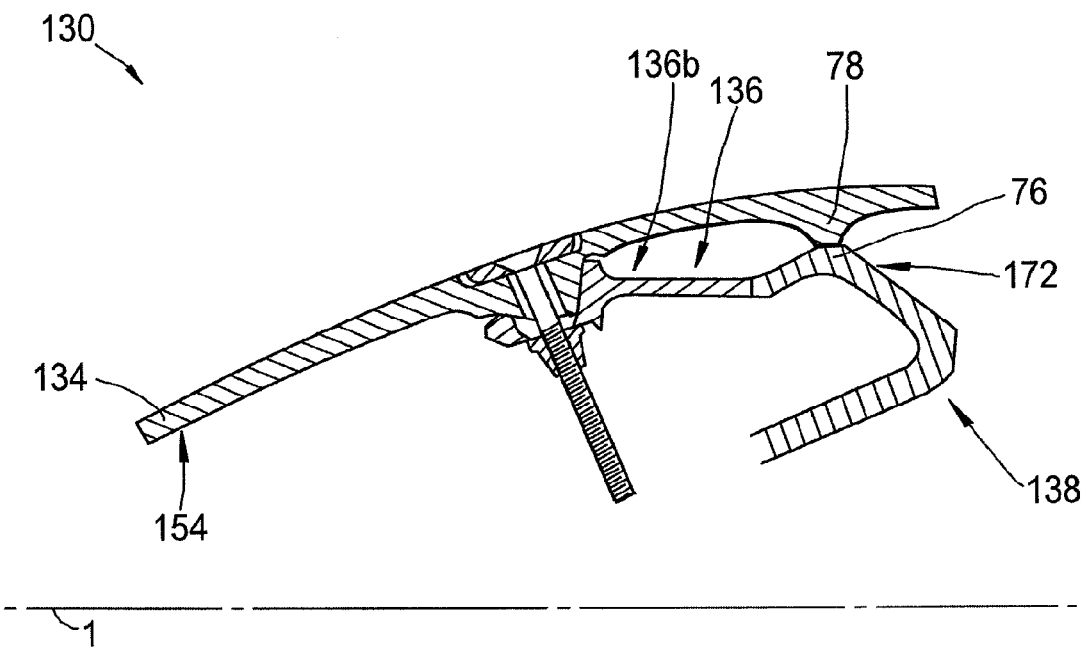
FIG. 4 is a sectional view of a nose cone assembly according to a second embodiment of the present invention.
Figure 5:
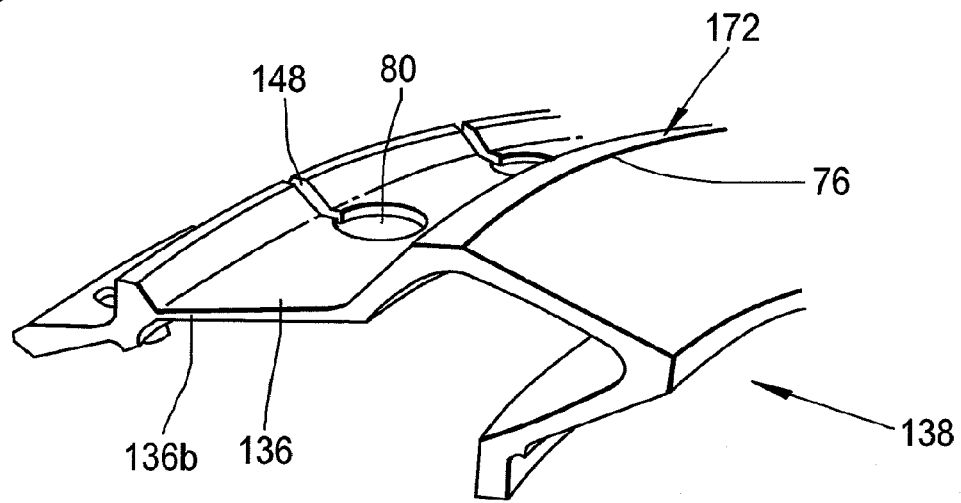
FIG. 5 is a perspective view of part of the nose cone assembly of FIG. 4.
Figure 6:
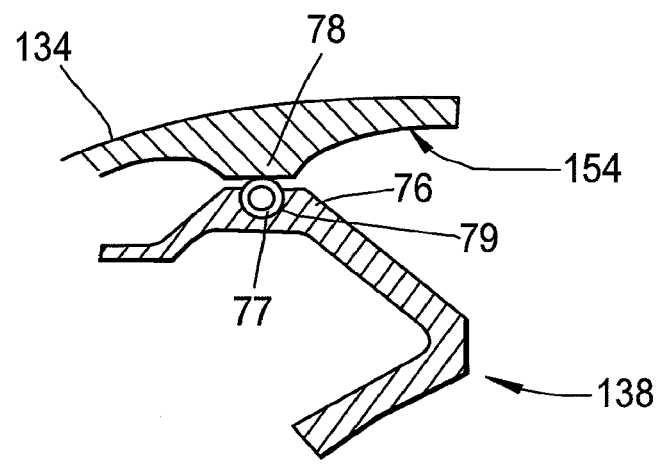
FIG. 6 is an enlarged sectional view of part of the nose cone assembly of FIGS. 4 and 5.

FIGS. 4 to 6 illustrate a second embodiment of a nose cone assembly 130 (FIG. 4) according to the invention. The nose cone assembly 130 (FIG. 4) shares many features in common with the nose cone assembly 30 of FIGS. 2 and 3, and corresponding features are therefore designated with the same reference numerals, prefixed by the number '1'.

The nose cone assembly 130 of FIG. 4 differs from the nose cone assembly 30 in that the radial locating means 172 (FIGS. 4 and 5) is in the form of a continuous circumferential shoulder 76 defined by the mounting ring 138. The circumferential shoulder 76 abuts a circumferential radially inwardly extending projection 78 (FIGS. 4 and 6) on the inner surface 154 (FIGS. 4 and 6) of the spinner 134 (FIGS. 4 and 6) and acts in the same manner as the spigots 74 described with reference to FIGS. 2 and 3 to provide further radial location of the spinner 134 relative to the mounting members 136 (FIGS. 4 and 5) and, hence, the fan hub 6 (FIG. 1).

Referring to FIG. 6, a resilient 'O' ring 77 may be located in an annular groove 79 in the circumferential shoulder 76 for abutment with the circumferentially extending projection 78 on the inner surface 154 of the spinner 134. This facilitates correct location and alignment between the shoulder 76 and the projection 78 and is sufficiently stiff to ensure concentricity when static but sufficiently flexible to allow easy mounting and removal of the spinner 134.

It will also be noted from FIG. 5 that the slots 148 between the mounting members 136 have a different geometry to the slots 48 illustrated in FIG. 3. In this embodiment, the slots 148 include radial holes 80 at their inner end and these may advantageously reduce stress concentration. Typically, the radial holes 80 are formed by a drilling operation prior to formation of the slots 148 by machining.

Figure 7:
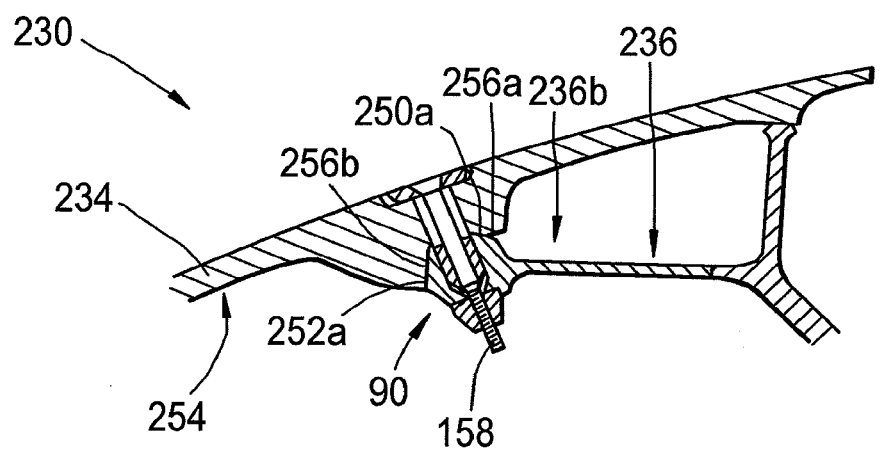
FIGS. 7 to 9 are sectional views of further embodiments of a nose cone assembly according to the present invention.

FIG. 7 illustrates an alternative nose cone assembly 230. The nose cone assembly 230 is similar to the nose cone assembly 30 of FIGS. 2 and 3, and corresponding features are therefore designated with the same reference numerals, prefixed by the number '2'.

The geometry of the mounting members 236 of the nose cone assembly 230 differs from the geometry of the mounting members 36 of the nose cone assembly 30 (of FIGS. 2 and 3) such that the axial and radial location surfaces 250a, 252a are defined by a shoulder 90 at the second end 236b of each mounting member 236. The inner surface 254 of the spinner 234 has been correspondingly modified to define a suitably shaped circumferentially extending recess for receiving the shoulder 90. As with the embodiment of FIGS. 2 and 3, the threaded fastener 158 in FIG. 7 provides a simultaneous clamping force between the axial and radial location surfaces 250a, 252a of each mounting member 236 and the corresponding axial and radial location surfaces 256a, 256b of the spinner 234.

Figure 8:
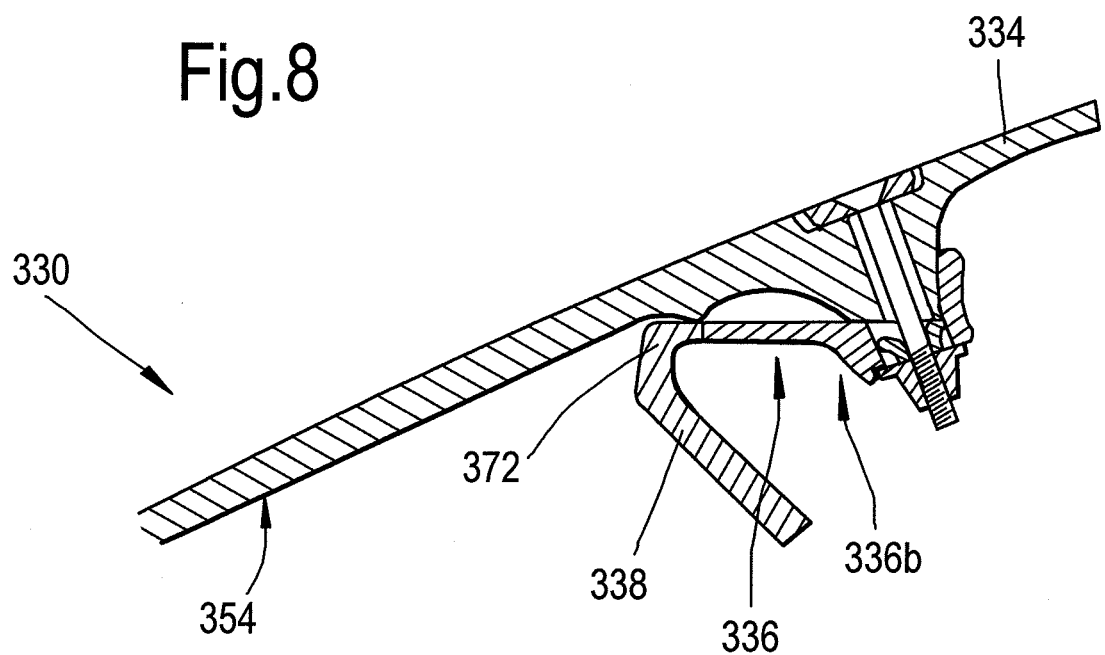
Figure 9:
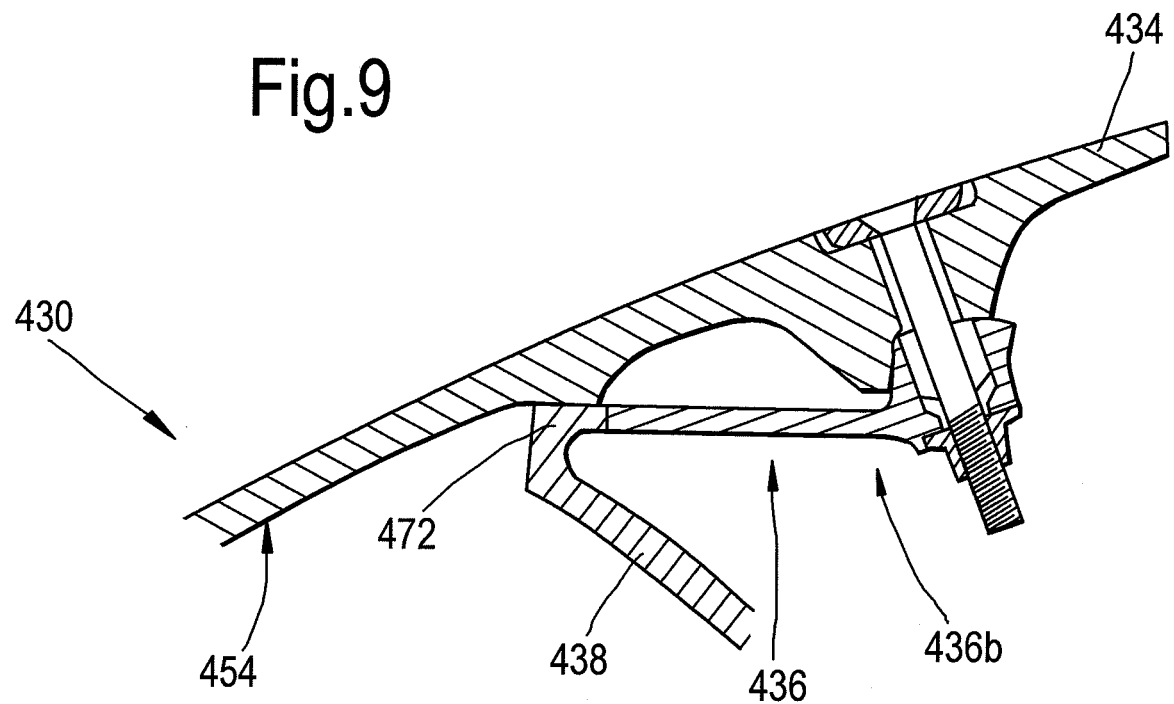

In the embodiments of FIGS. 2 through 7, the radial locating means 72 (FIGS. 2 and 3), 172 (FIGS. 4 and 5) is provided downstream of the second end 36b (FIGS. 2 and 3), 136b (FIGS. 4 and 5), 236b (FIG. 7) of the mounting member 36 (FIGS. 2 and 3), 136 (FIGS. 4 and 5), 236 (FIG. 7) and hence downstream of the interface at which the spinner 34 (FIG. 2), 134 (FIGS. 4 and 6), 234 (FIG. 7) is clamped to the mounting member 36, 136, 236. FIGS. 8 and 9 illustrate alternative embodiments of nose cone assemblies 330 (FIG. 8), 430 (FIG. 9) in which the radial locating means 372 (FIG. 8), 472 (FIG. 9) is provided upstream of the second end 336b (FIG. 8), 436b (FIG. 9) of the mounting member 336 (FIG. 8), 436 (FIG. 9) and hence upstream of the interface at which the spinner 334 (FIG. 8), 434 (FIG. 9) is clamped to the mounting member 336 (FIG. 8), 436 (FIG. 9).

In these alternative embodiments, the radial locating means 372, 472 is defined by the mounting ring 338 (FIG. 8), 438 (FIG. 9) which abuts the inner surface 354 (FIG. 8), 454 (FIG. 9) of the spinner 334, 434.

Although embodiments of the present invention have been described in the preceding paragraphs with reference to various examples, it should be appreciated that modifications to the examples given may be made without departing from the scope of the invention, as claimed. For example, mounting members 36 (FIGS. 2 and 3) could be formed integrally with the fan hub 6 (FIGS. 1 and 2), thus obviating the need for the mounting ring 38. The mounting members 36 could be of any suitable configuration or geometry. In order to facilitate correct balancing of the nose cone assembly, different length threaded fasteners 58 (FIG. 2) could be used to provide more or less mass at different circumferential locations.

I claim:

1. A nose cone assembly for a gas turbine engine, the nose cone assembly comprising a spinner and a plurality of circumferentially spaced mounting members directly flexibly connecting the spinner to a fan hub of the gas turbine engine, each of the mounting members being rigid in a generally axial direction and flexible in a generally radial direction.

2. A nose cone assembly according to claim 1, wherein each mounting member includes a first end which is constrained against movement in the axial direction and a second end which is movable in the radial direction.

3. A nose cone assembly according to claim 1, wherein each mounting member includes axial and radial location surfaces to provide both axial and radial location of the spinner thereon.

4. A nose cone assembly according to claim 3, wherein each mounting member includes a first end which is constrained against movement in the axial direction and a second end which is moveable in the radial direction, and wherein the axial and radial location surfaces are provided at the second end of each mounting member.

5. A nose cone assembly according to claim 4, wherein the axial and radial location surfaces are defined by substantially orthogonal adjacent surfaces at the second end of each mounting member.

6. A nose cone assembly according to claim 3, wherein each mounting member includes axial and radial flange members defining respectively the axial and radial location surfaces.

7. A nose cone assembly according to claim 6, wherein the axial and radial flange members together define a substantially L-shaped flange at a second end of each mounting member.

8. A nose cone assembly according to claim 3, wherein the spinner includes axial and radial location surfaces co-operable with the corresponding axial and radial location surfaces of the plurality of mounting members.

9. A nose cone assembly according to claim 8, wherein the spinner axial and radial location surfaces are continuous circumferentially extending surfaces.

10. A nose cone assembly according to claim 8, wherein the assembly further comprises fastening means to attach the spinner to the plurality of mounting members, the fastening means being arranged to provide a simultaneous clamping force between the axial and radial location surfaces of the spinner and the corresponding axial and radial location surfaces of the plurality of mounting members.

11. A nose cone assembly according to claim 10, wherein the fastening means further comprise threaded fasteners and a respective threaded fastener cooperates with each mounting member such that the spinner is secured to the plurality of mounting members.

12. A nose cone assembly according to claim 11, wherein the threaded fasteners are each disposed at an angle to both the axial and radial location surfaces of the mounting members and the corresponding axial and radial location surfaces of the spinner.

13. A nose cone assembly according to claim 11, wherein the threaded fasteners each extend in a direction substantially perpendicular to an outer surface of the spinner.

14. A nose cone assembly according to claim 1, wherein the plurality of mounting members form part of a generally annular mounting ring which is secured in use to the fan hub of the gas turbine engine.

15. A nose cone assembly according to claim 14, wherein each mounting member includes a first end which is constrained against movement in the axial direction and a second end which is moveable in the radial direction, and wherein the mounting ring acts to prevent radial movement of the first end of each of the mounting members.

16. A nose cone assembly according to claim 1, wherein the assembly includes a radial locating means arranged to abut an inner surface of the spinner.

17. A nose cone assembly according to claim 16, wherein the plurality of mounting members form part of a generally annular mounting ring which is secured in use to the fan hub of the gas turbine engine, and wherein the radial locating means extends circumferentially around the mounting ring.

18. A nose cone assembly according to claim 16, wherein the radial locating means includes a plurality of said radial locating means, a respective one of said radial locating means being provided on each of the mounting members.

19. A gas turbine engine comprises, in flow series: an inlet, a fan, a core engine having a compressor, a combustor, a turbine, and an exhaust, wherein the fan, compressor, and turbine are all arranged to rotate about a central common engine axis, and a nose cone assembly having a spinner and a plurality of circumferentially spaced mounting members directly flexibly connecting the spinner to a fan hub of the gas turbine engine, each of the mounting members being rigid in a generally axial direction and flexible in a generally radial direction.

* * * * *